(12) United States Patent
Hayes

(10) Patent No.: US 11,554,707 B2
(45) Date of Patent: Jan. 17, 2023

(54) KAYAK TRANSPORTING APPARATUS

(71) Applicant: John William Hayes, Palm Coast, FL (US)

(72) Inventor: John William Hayes, Palm Coast, FL (US)

(*) Notice: Subject to any disclaimer, the term of this patent is extended or adjusted under 35 U.S.C. 154(b) by 265 days.

(21) Appl. No.: 16/943,634

(22) Filed: Jul. 30, 2020

(65) Prior Publication Data

US 2021/0206309 A1  Jul. 8, 2021

Related U.S. Application Data

(60) Provisional application No. 62/957,907, filed on Jan. 7, 2020.

(51) Int. Cl.
*B60P 3/10* (2006.01)
*B60D 1/07* (2006.01)
*B60R 9/06* (2006.01)

(52) U.S. Cl.
CPC .................. *B60P 3/1033* (2013.01)

(58) Field of Classification Search
CPC ......... B60P 3/10; B60P 3/1033; B60P 3/1066; B60R 9/06; B60R 9/08; B60D 1/07
USPC .......................... 224/488, 518, 519, 520, 521
See application file for complete search history.

(56) References Cited

U.S. PATENT DOCUMENTS

| | | | | |
|---|---|---|---|---|
| 5,520,315 A * | 5/1996 | Graham | ..................... | B60R 9/10 224/521 |
| 5,884,930 A * | 3/1999 | Cluth | ..................... | B60D 1/52 224/521 |
| 6,089,431 A * | 7/2000 | Heyworth | ............... | B60D 1/075 224/521 |
| 6,155,623 A * | 12/2000 | Lane | ......................... | B60P 3/40 224/521 |
| 6,655,562 B2 | 12/2003 | Jeong | | |
| 7,070,196 B1 | 7/2006 | Larsen et al. | | |
| 7,243,966 B1 * | 7/2007 | Sheldon | ..................... | B60P 3/40 410/32 |
| 8,590,758 B2 * | 11/2013 | Gray | ......................... | B60P 3/10 224/532 |
| D708,099 S | 7/2014 | Oman | | |
| 8,919,627 B2 * | 12/2014 | Brinkley | .................. | B60R 9/065 224/521 |
| 9,156,392 B2 | 10/2015 | Whiteford | | |

(Continued)

FOREIGN PATENT DOCUMENTS

CA           2772565 A1     9/2013

*Primary Examiner* — Anne Marie M Boehler

(57) ABSTRACT

An objective of the present invention is to provide users with a kayak transporting apparatus to assist the users in the transportation of a kayak with minimum effort and strain to the users' body. The present invention provides a kayak carrier for a vehicle that can be adjusted to fit various sizes and shapes of kayak. The present invention is a low-profile apparatus compared to other kayak transporting apparatuses. The kayak transporting apparatus is also intended to be easily stored away as the kayak transporting apparatus is light-weight and the components of the apparatus are detachable from each other. Further, the present invention is a hitch attachment for the rear of a vehicle which facilitates the backing of a vehicle compared to a trailer ball attachment of other kayak transporting apparatuses. Thus, the present invention is a light weight, compact, versatile apparatus for transporting kayaks efficiently.

15 Claims, 10 Drawing Sheets

(56) References Cited

U.S. PATENT DOCUMENTS

| | | | |
|---|---|---|---|
| 9,333,822 B1 * | 5/2016 | LaFave | B60R 9/06 |
| 9,694,759 B1 * | 7/2017 | VanAmburgh | B60R 9/08 |
| 10,053,170 B2 | 8/2018 | Boggess | |
| 2007/0262108 A1 * | 11/2007 | Columbia | B60R 9/06 |
| | | | 224/519 |
| 2013/0020364 A1 * | 1/2013 | Sautter | B60R 9/06 |
| | | | 224/497 |
| 2013/0240586 A1 * | 9/2013 | Liu | B60R 9/08 |
| | | | 224/485 |
| 2014/0069881 A1 | 3/2014 | Hannan | |
| 2015/0083769 A1 * | 3/2015 | Williams | B60R 9/10 |
| | | | 224/488 |
| 2016/0185303 A1 * | 6/2016 | Oxley | B60R 9/06 |
| | | | 224/519 |
| 2018/0105119 A1 * | 4/2018 | Spivia | B60R 9/08 |

* cited by examiner

KAYAK TRANSPORTING APPARATUS

The current application claims a priority to the U.S. Provisional Patent application Ser. No. 62/957,907 filed on Jan. 7, 2020.

FIELD OF THE INVENTION

The present invention relates generally to kayak transporting apparatuses. More specifically, the present invention is an attachment on the rear end of a vehicle that assist the user in transporting the user's kayak. The present invention is a kayak transporting apparatus that makes it easier for users to load, transport and launch their kayak with minimum effort for the user.

BACKGROUND OF THE INVENTION

There are many different apparatuses that assist with the transportation of a kayak from one place to another. Common kayak transportation methods include hitch attachments on the rear end of a vehicle or kayak attachment on the roof rails of a vehicle. When it comes to the transportation of a kayak, it can be difficult due to the effort of heavy lifting and maneuverability of different sized kayak. There are also many different apparatuses used for transporting a kayak, such as roof rails on top of a vehicle. Roof rails are hard to reach compared to attachments on the rear end of a vehicle. Another issue with previous kayak transporting apparatuses is the hassle of storing the apparatus away when not in use.

An objective of the present invention is to provide users with a kayak transporting apparatus to assist the users in the transportation of a kayak with minimum effort and strain to the users' body. The present invention provides a kayak carrier for a vehicle that can be adjusted to fit various sizes and shapes of kayak. The present invention is a low-profile apparatus meaning that the apparatus is provided low to the ground compared to other kayak transporting apparatuses. The kayak transporting apparatus is also intended to be easily stored away as the kayak transporting apparatus is lightweight and the components of the apparatus are detachable from each other. Further, the present invention is a hitch attachment for the rear of a vehicle which facilitates the backing of a vehicle compared to a trailer ball attachment of other kayak transporting apparatuses. Thus, the present invention is a light weight, compact and versatile apparatus for transporting kayaks and similar paddle boats efficiently.

DETAIL DESCRIPTIONS OF THE INVENTION

Figure 1:
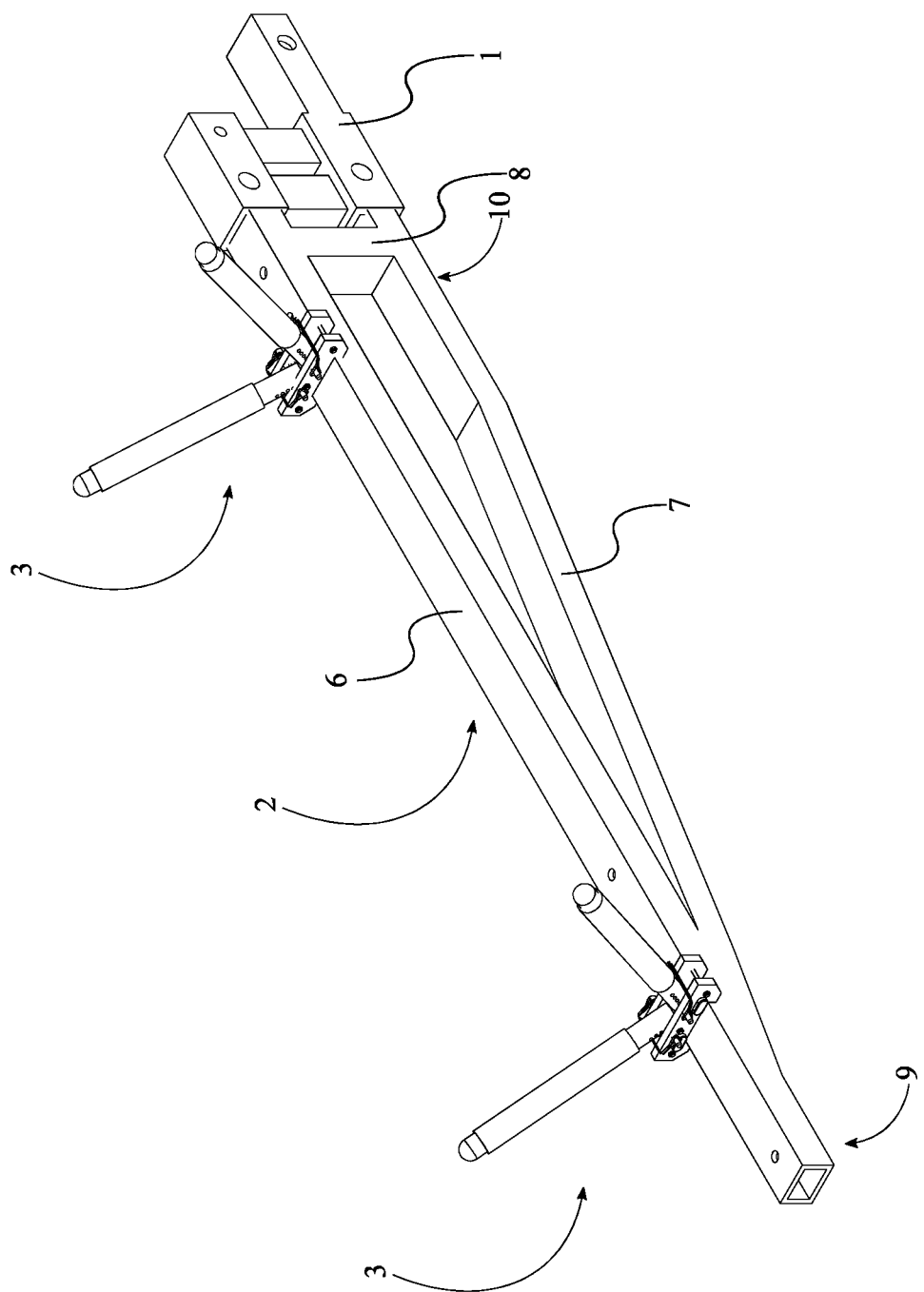
FIG. 1 is a top-front-left perspective view of the present invention.
Figure 2:
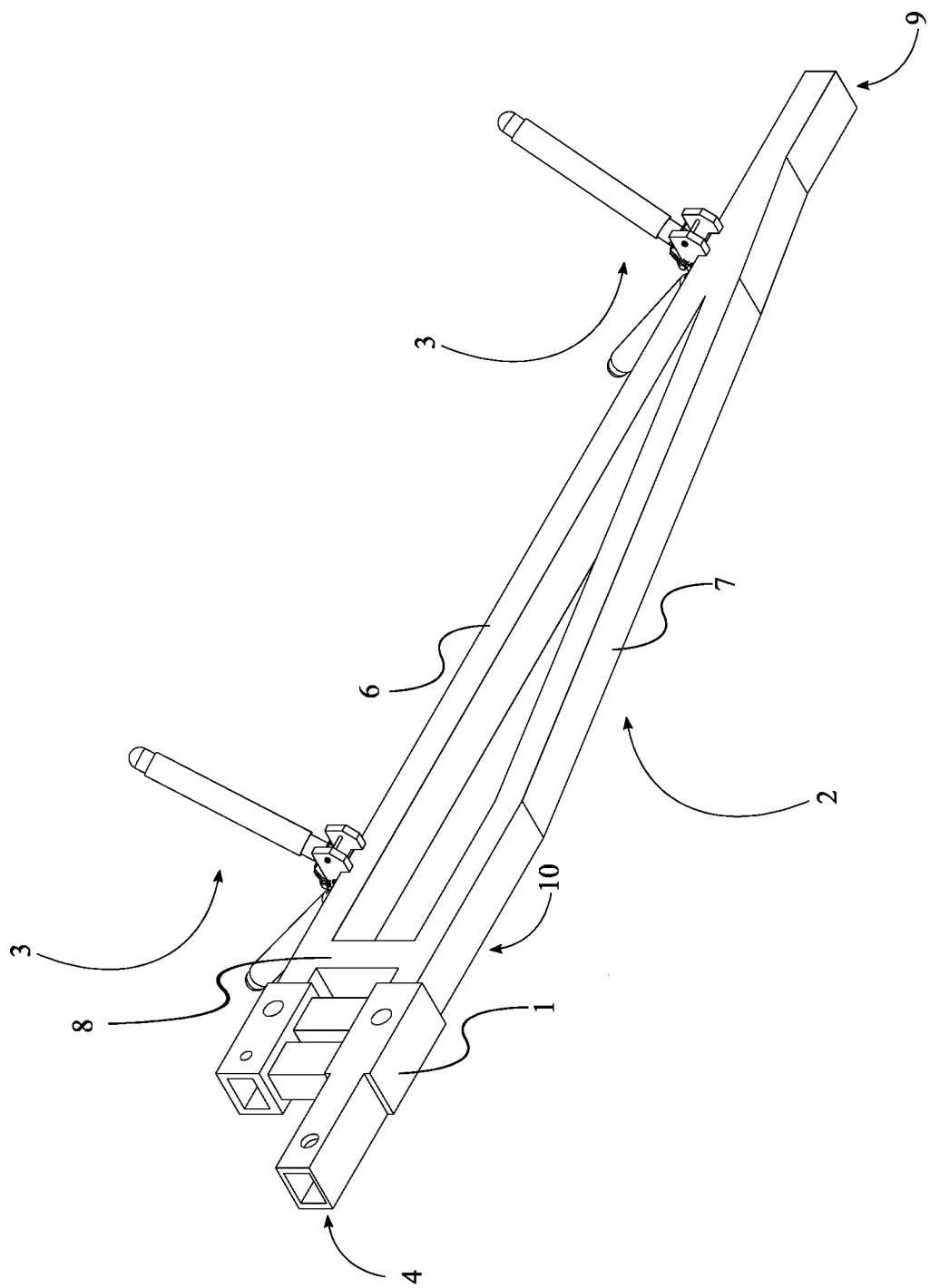
FIG. 2 is a bottom-rear-right perspective view of the present invention.

All illustrations of the drawings are for the purpose of describing selected versions of the present invention and are not intended to limit the scope of the present invention.

In reference to FIG. 1 through FIG. 10, the present invention is a personal kayak transporting device that handles one kayak at a time. An objective of the present invention is to provide users with a kayak transporting apparatus to assist the users in the transportation of a kayak with minimum effort and strain to the users' body. The present invention provides a kayak carrier for a vehicle that can be adjusted to fit various sizes and shapes of kayak. Further, the present invention is a low-profile apparatus meaning that the apparatus is provided low to the ground compared to other kayak transporting apparatuses. The low-profile of the apparatus allow ease of kayak loading and unloading as well as allows the vehicle to pass under low overhead clearance areas that would not be possible with a conventional roof mounted kayak rack. The maneuverability of the kayak transporting apparatus allows various shapes and sizes of kayak to be transported with ease as it is a low-profile apparatus as oppose to overhead or on the roof of a vehicle. The angle of the kayak transporting apparatus is on plane with the angle of the tow vehicle on the ramp, thus the kayak transporting apparatus and the kayak enters the water with more ease than a trailer. As the tow vehicle backs down a boat ramp, the kayak's angle is identical to the angle of the tow vehicle. This allows for the rapid deployment of the kayak into the water. Retrieving the kayak from the water is just as easy due to the angle and low profile of the kayak transporting apparatus. There are no moving parts on the present invention as like a trailer would have wheels on the bottom. Furthermore, the kayak transporting apparatus is also easy to affix, utilize, and store due to the versatility of being detachable from one part to another. The present invention is also intended to be easily stored away as the kayak transporting apparatus is lightweight and the components of the apparatus are detachable from each other. Additionally, the present invention is a hitch attachment for the rear of a vehicle which facilitates the backing of a vehicle compared to a trailer ball attachment of other kayak transporting apparatuses. Thus, the present invention is a lightweight, compact, versatile apparatus for transporting kayaks efficiently.

The following description is in reference to FIG. 1 through FIG. 10. In a preferred embodiment, the present invention comprises a dual hitch receiver 1, a support frame 2, and a plurality of cradle assemblies 3. According to the preferred embodiment, the dual hitch receiver 1 comprises a single attachment end 4 and a dual attachment end 5. Preferably, the dual hitch receiver 5 is a component that couples the support frame 2 to the vehicle and comprises a sturdy material such as a metal. However, the dual hitch receiver 1 may comprise any other material or brand, that is known to one of ordinary skill in the art, as long as the intends and objectives of the present invention is not hindered. As seen in FIG. 1, FIG. 2, and FIG. 7 and FIG. 10, the support frame 2 comprises an upper frame 6, a lower frame 7, a reinforcement frame 8, a front end 9 and a rear end 10. Preferably, the upper frame 6 and the lower frame 7 comprise hollow aluminum (Al) frames with a rectangular cross section. Aluminum is chosen as the preferred material for the support frame 2 because of its strength vs weight, and its resistance to rusting. However, any other material that does not alter the purpose of the present invention may be used for the support frame 2. Further, the single attachment end 4 is positioned opposite to the dual attachment end 5 across the dual hitch receiver 1. The orientation of the single attachment end 4 and the dual attachment end 5 is such that the single attachment end 4 is connected to the vehicle, and the dual attachment end 5 is connected to the support frame 2. Furthermore, the front end 9 is positioned opposite to the rear end 10 across the support frame 2, such that the front end 9 of the support frame 2 faces away from the vehicle and the rear end 10 of the support frame 2 is connected to the dual hitch receiver 1. Accordingly, for operation, the rear end 10 of the support frame 2 is inserted into the dual attachment end 5 of the dual hitch receiver 1.

According to the preferred embodiment of the present invention, the reinforcement frame 8 is connected between the upper frame 6 and the lower frame 7. This is so that the reinforcement frame 8 provides additional support to the support frame 2. Further, the reinforcement frame 8 is positioned adjacent the rear end 10 of the support frame 2. This arrangement of the reinforcement frame 8 also acts as a stop for the support frame 2 when inserted into the dual hitch receiver 1. In other words, when the support frame 2 is inserted into the dual attachment end 5 of the dual hitch receiver 1, the reinforcement frame 8 will stop the support frame 2 from being inserted into the dual hitch receiver 1 any further than what is necessary for the present invention to operate smoothly.

Figure 10:
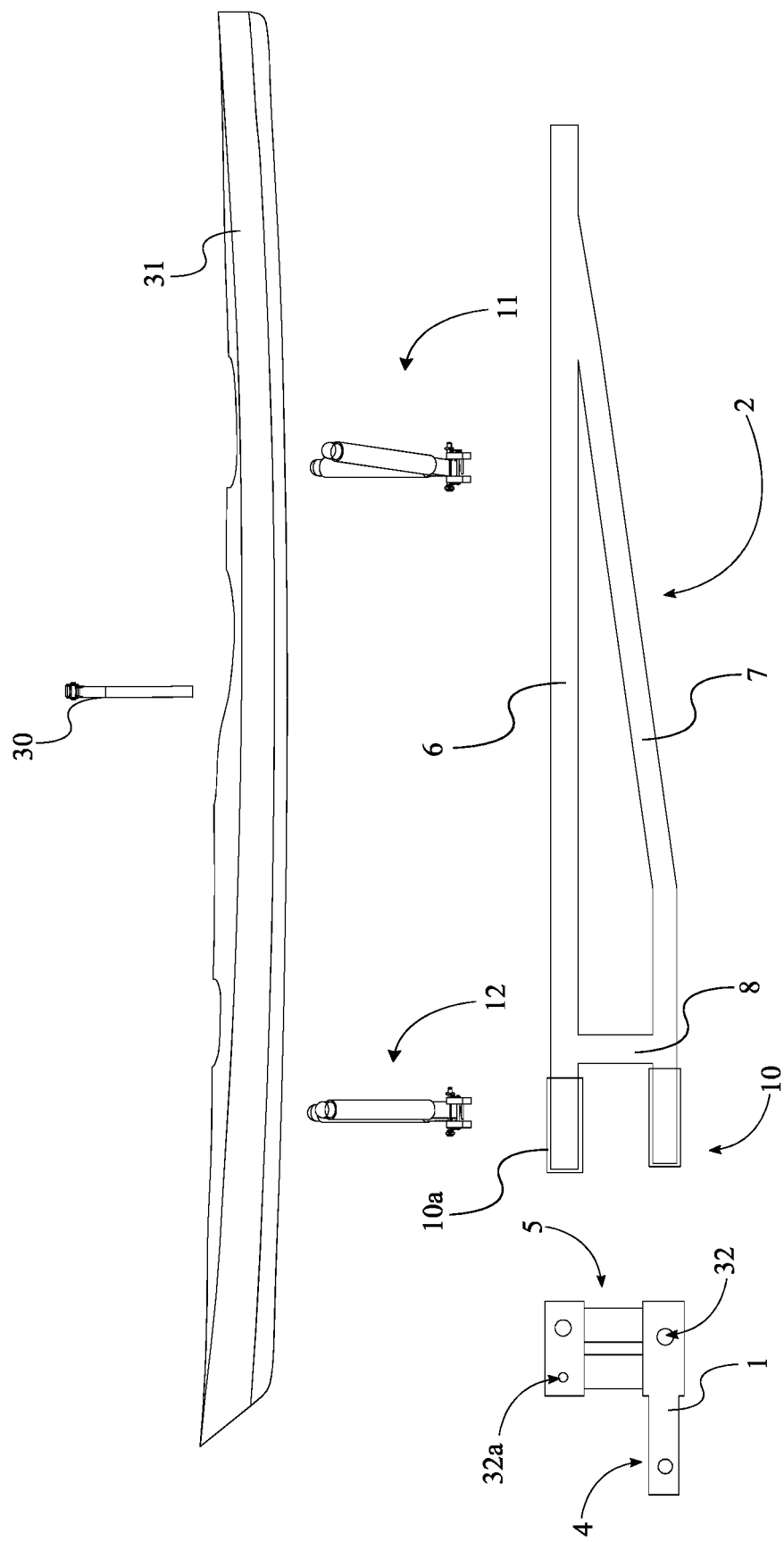
FIG. 10 is an exploded view of FIG. 9.

As seen in FIG. 1 through FIG. 3, and FIG. 7 through FIG. 10, the lower frame 7 is terminally attached to the upper frame 6, and the lower frame 7 is angularly offset from the upper frame 6. This arrangement helps to minimize the distance from the lower frame 7 to the ground and maximize support for the upper frame 6. The angular attachment of the lower frame 7 and upper frame 6 also improves the stability of the apparatus as a whole. Smaller vehicles with minimal ground clearance require this additional space so that if vehicles were to go over any speed bumps or of the likes, the apparatus would not scrap the ground and potentially damage the kayak transporting apparatus. Further, the structural design of the support frame 2 distributes the kayak weight across the dual hitch receiver 1 which eliminate metal fatigue by minimizing frame bounce and sway during transport. Furthermore, as seen in FIG. 10, the rear end 10 of the support frame 2 that enters the dual attachment end 5 of the dual hitch receiver 1 may comprise additional layers of Al (frame inserts 10a), affixed around the support frame 2. This is so that the connection points of the support frame 2 joining the dual hitch receiver 1 is strong enough to support the load of the kayak.

As an alternate embodiment to the above-mentioned frame inserts 10a, a dual hitch receiver that can extend into the support frame 2 may be built, thereby eliminating the need for frame inserts. In such embodiments, the dual hitch receiver is built with steel tubing that slides into the support frame 2.

It is an aim of the present invention to contain and transport kayaks of different sizes and shapes, with ease. In order to accomplish that, a first cradle assembly 11 from the plurality of cradle assemblies 3 is mounted onto the upper frame 6, adjacent the front end 9, and a second cradle assembly 12 from the plurality of cradle assemblies 3 is mounted onto the upper frame 6, adjacent the rear end 10. As seen in FIG. 1 through FIG. 3, and FIG. 7 through FIG. 10, the plurality of cradle assemblies 3 are attachments on the upper frame 6 of the support frame 2 that cradle the kayak. In other words, the first cradle assembly 11 and second cradle assembly 12 are the main components that securely hold the kayak that needs to be transported.

According to the preferred embodiment, each of the plurality of cradle assemblies 3 comprises a cradle mount 13, a channel 14, a first tube 15, and a second tube 16. Preferably, the cradle mount 13 is mounted adjacent the upper frame 6, opposite to the reinforcement frame 8. In other words, the cradle mount 13 is attached onto the upper frame 6 using a suitable stable cradle fastener. Preferably, nuts and bolts are used to fasten the cradle mount 13 onto the upper frame 6. However, any other sturdy method of fastening and/or fasteners that are known to one of ordinary skill in the art, and which do not alter the intended objects of the present invention may be used. The channel 14 normally traverses through a bottom surface of the cradle mount 13, and the upper frame 6 is engaged within the channel 14. Preferably, the channel 14 is a rectangular slot that confines to the geometry of the upper frame 6. This arrangement and shape of the channel 14 allow the cradle mount 13 to be adjustable along the length of the upper frame 6 and thus enable the user to conveniently position the plurality of cradle assemblies 3, with respect of the length of the user's kayak. Further, the channel 14 on the bottom further maintains the center position of the cradle assemblies 3 on the support frame 6 while adjusting the cradle mount 13.

Continuing with the preferred embodiment of the present invention, the first tube 15 and the second tube 16 are axially mounted within the cradle mount 13, wherein the axial mounting permits angular displacement of the first tube 15 and the second tube 16 with respect to a longitudinal axis 17 of the cradle mount 13. Further, this axial mounting allows the user to adjust the angle of the first tube 15 and the second tube 16 in to incline perfectly according to the size and shape of the kayak. As seen in FIG. 1 through FIG. 10, the personal kayak transporting device further comprises a first roller 18 and a second roller 19, wherein the first roller 18 is wrapped around the first tube 15 and the second roller 19 is wrapped around the second tube 16. Preferably, the first roller 18 and the second roller 19 are covers for the first tube 15 and the second tube 16 respectively, as they will cradle the user's kayak with stability and prevent any damage on the kayak when it comes to contact with the personal kayak transporting device. Further, the first roller 18 and the second roller 19 are also used to assist the user with mounting their kayak onto the present invention as the rollers can roll and allow the user to easily slide their kayak in place. Preferably, the first roller 18 and the second roller 19 fit in a snug fashion around the first tube 15 and the second tube 16 respectively and comprise a foamy and/or cushiony material. However, any other material that is known to one of ordinary skill in the art and that does not hinder with the intents of the present invention may be used for the first roller 18 and the second roller 19.

Figure 4:
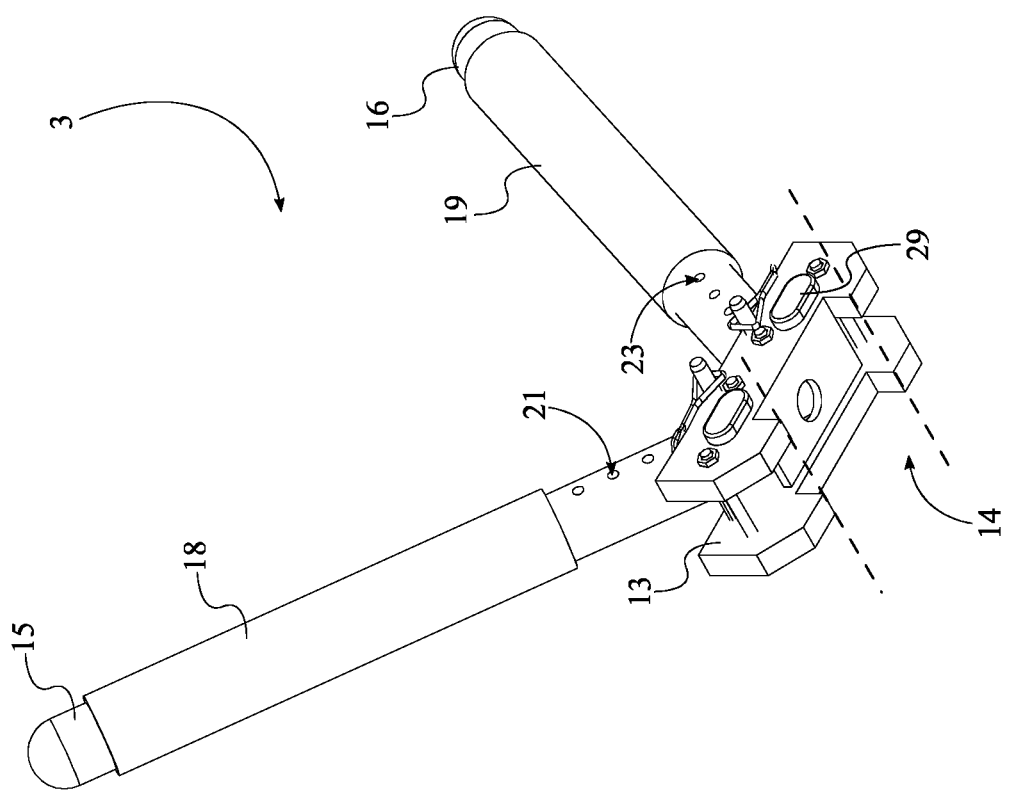
FIG. 4 is a bottom-rear-right plan view of a single cradle assembly.
Figure 5:
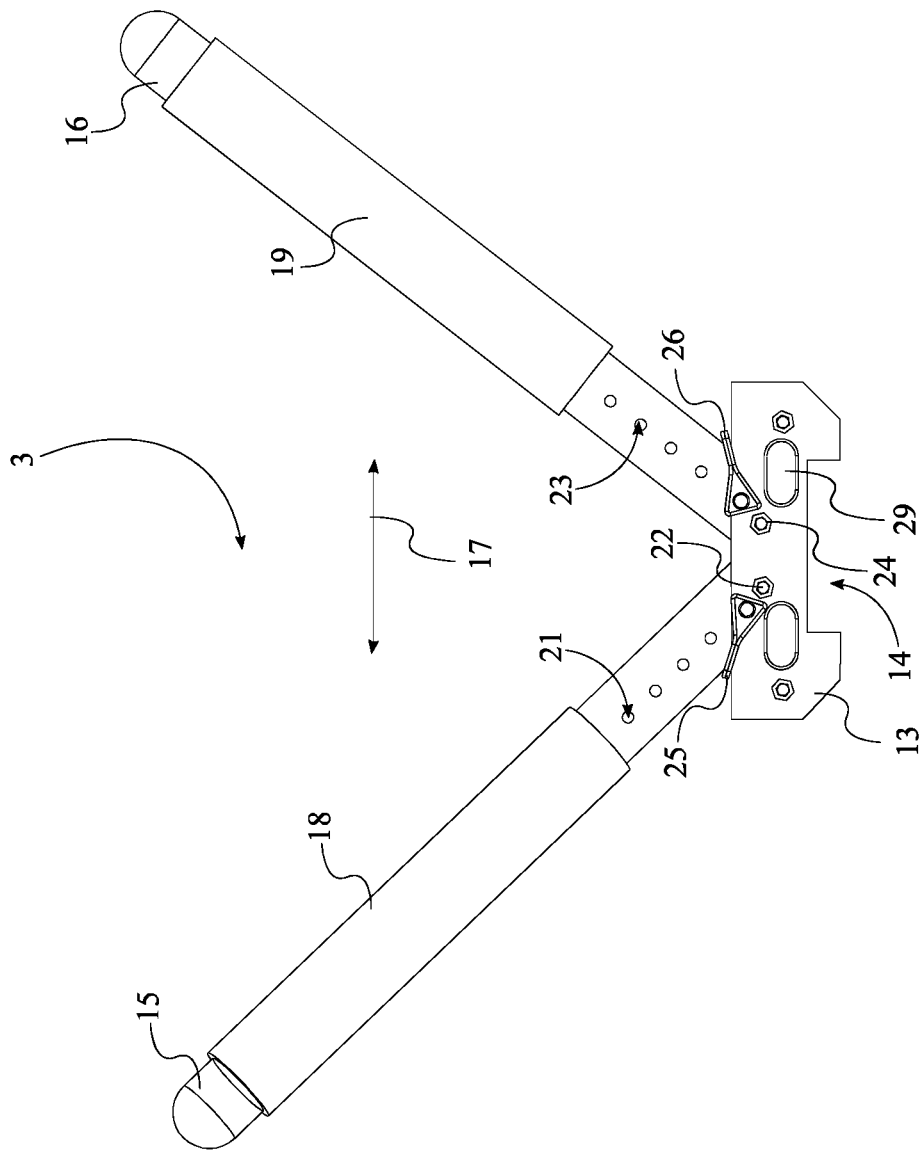
FIG. 5 is a front elevational view of the single cradle assembly.
Figure 6:
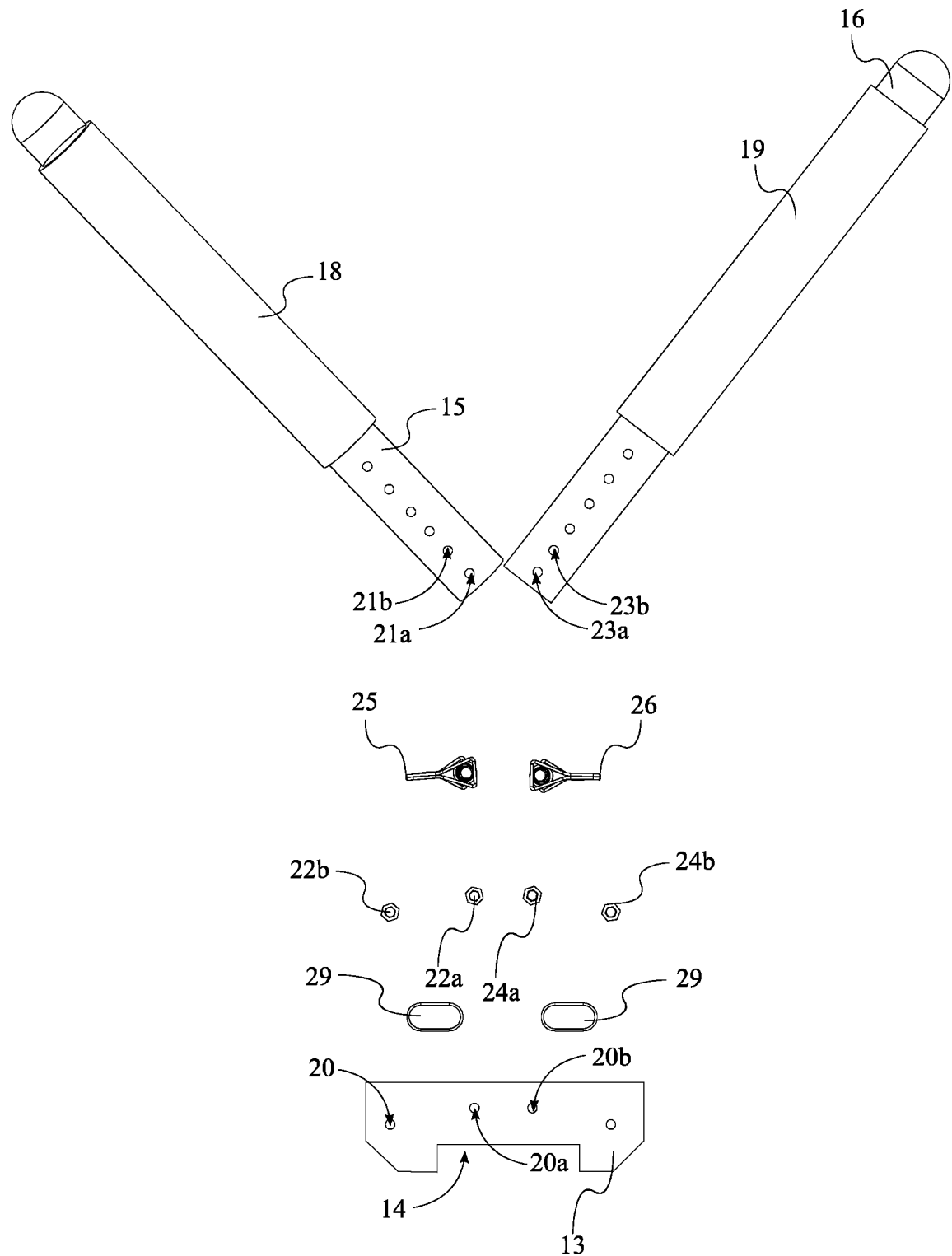
FIG. 6 is an exploded view of FIG. 5.
Figure 7:
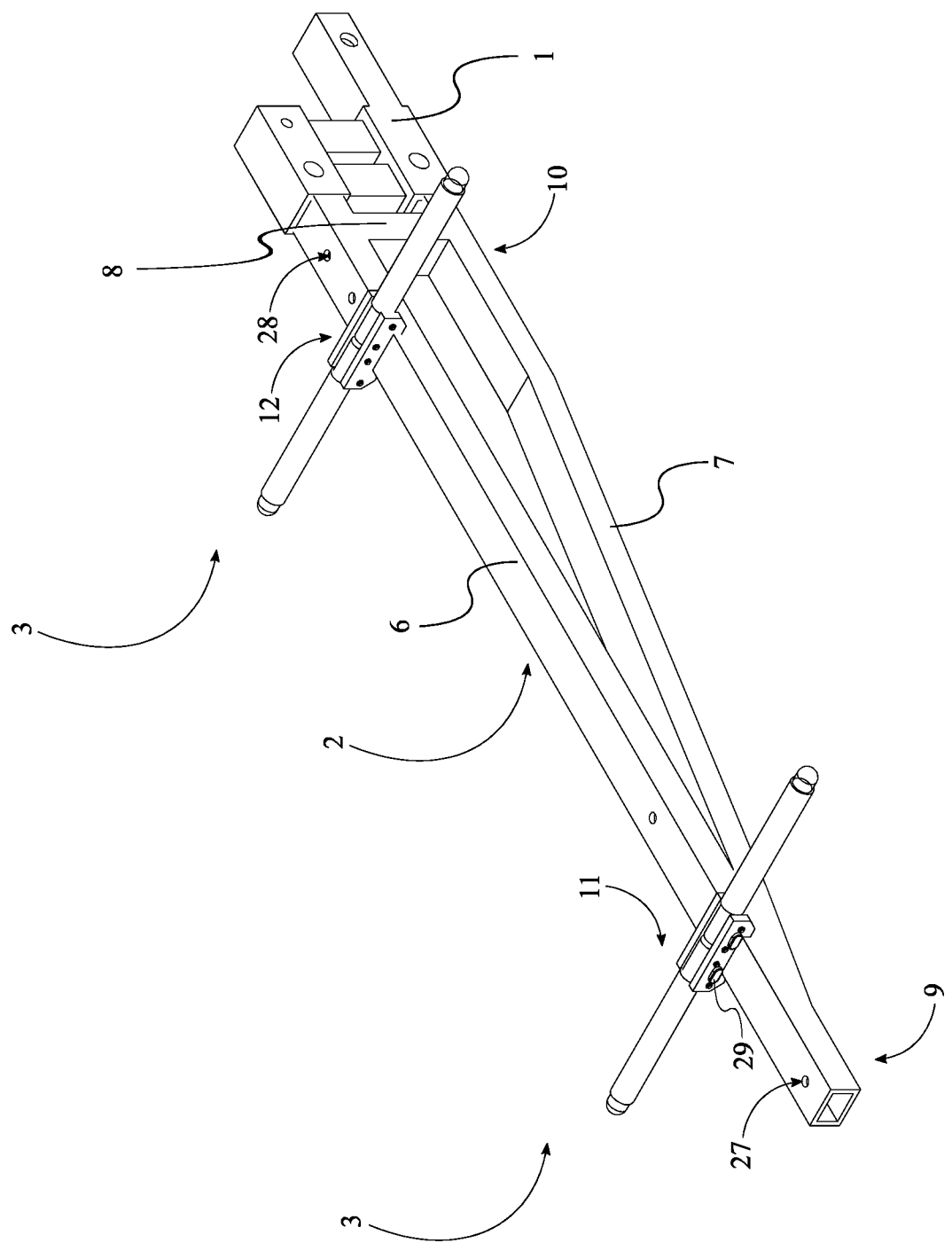
FIG. 7 is a top-front-left perspective view of the present invention, wherein the support tubes are in a flat configuration.
Figure 8:
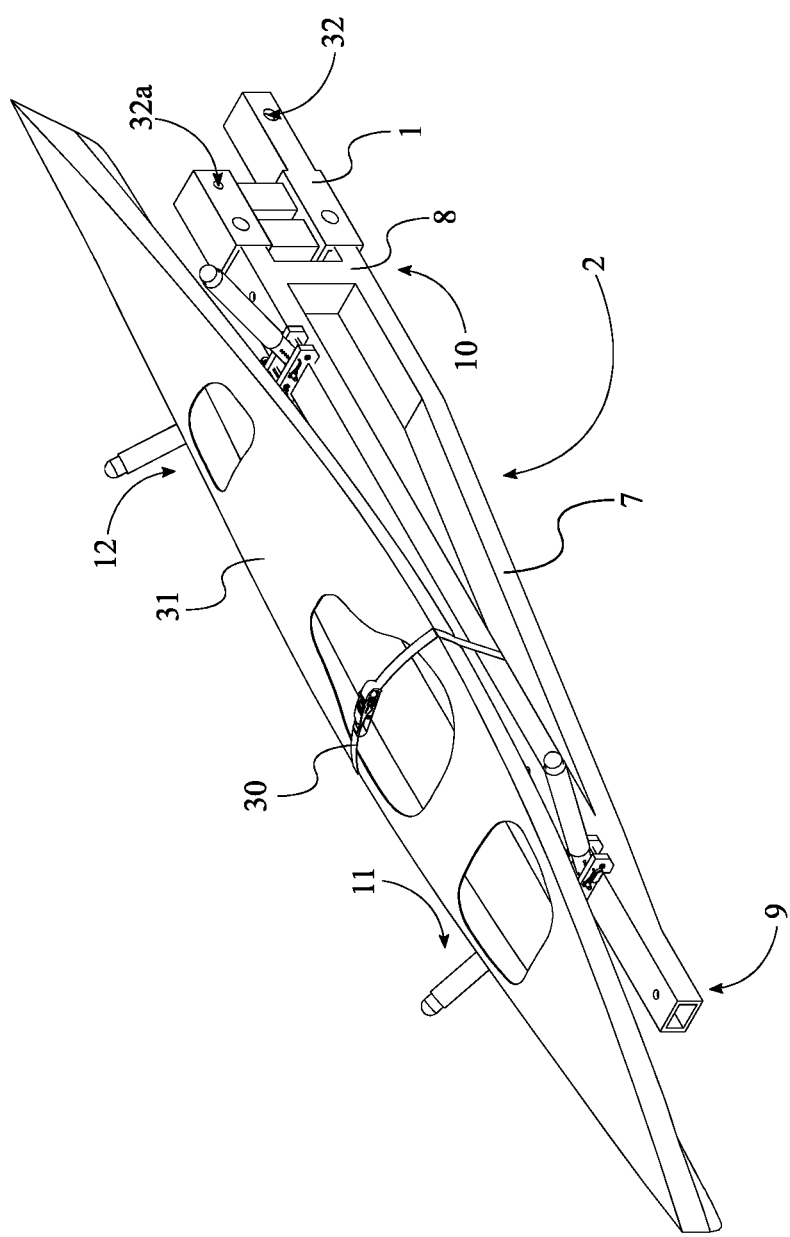
FIG. 8 is a top-front-left perspective view of the present invention, wherein a kayak is placed on the cradle assemblies and secured with a fastening strap.
Figure 9:
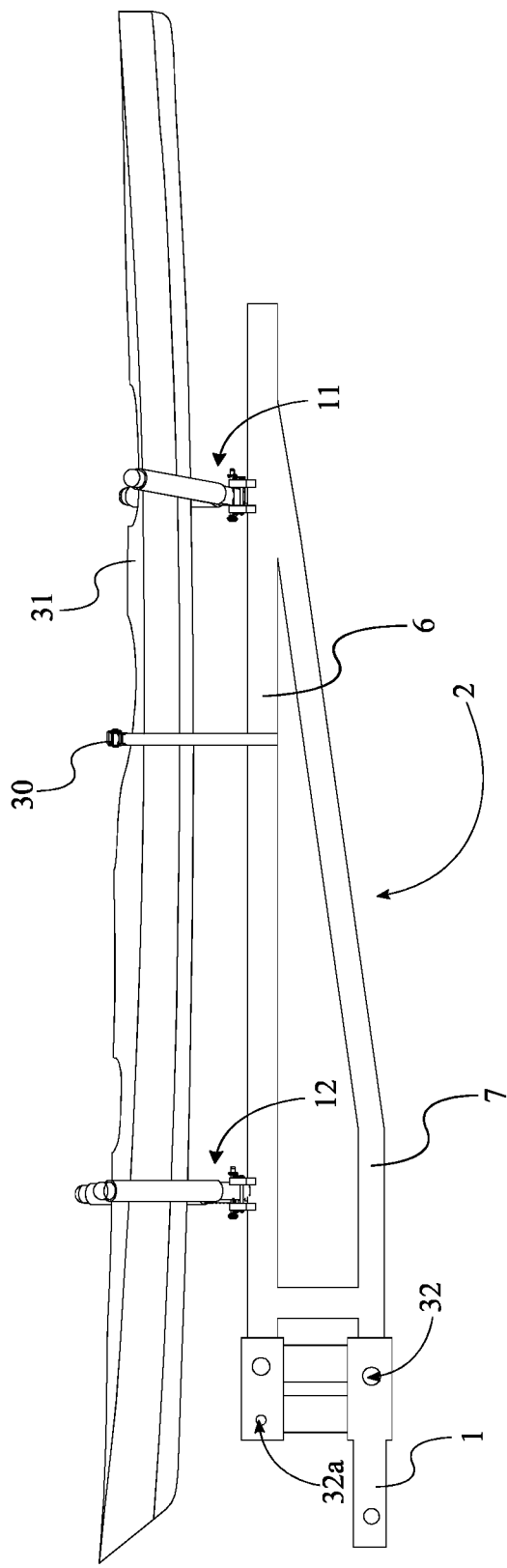
FIG. 9 is a right-side elevational view of the present invention, with the kayak and the fastening strap.

According to the preferred embodiment of the present invention, each of the plurality of cradle assemblies 3 further comprises a plurality of cradle fastener holes 20, a plurality of first tube holes 21, a first tube fastener 22a, a plurality of second tube holes 23, and a second tube fastener 24a. As seen in FIG. 4 through FIG. 6, the plurality of cradle fastener holes 20 normally traverses through the cradle mount 13 and the plurality of first tube holes 21 normally traverses through the first tube 15. The arrangement of the various holes is in such a way that they help with fastening of the various elements of the plurality of cradle assemblies 3. For example, according to the preferred embodiment, the first tube fastener 22a is connected between a corresponding first tube cradle fastener hole 20a and a corresponding first tube hole 21a, wherein the corresponding first tube cradle fastener hole 20a is from the plurality of cradle fastener holes 20, and wherein the corresponding first tube hole 21a is from the plurality of first tube holes 21. Similarly, the plurality of second tube holes 23 normally traverses through the second tube 16, such that the second tube fastener 24a is connected between a corresponding second tube cradle fastener hole 20b and a corresponding second tube hole 23a, wherein the corresponding second tube cradle fastener hole 20b is from the plurality of cradle fastener holes 20, and wherein the corresponding second tube hole 23a is from the plurality of second tube holes 23. Preferably, the plurality of first tube holes 21 comprises six holes penetrating across the length of the first tube 15, wherein the inner most hole out of the six holes is centered closely to the edge of the first tube 15. The other five holes are uniformly spaced across the first tube 15. However, it should be noted that the plurality of first tube holes 21 and the plurality of second tube holes 23, may comprise any number and spacing, as long as the objectives of the present invention is not altered. Accordingly, the plurality of cradle fastener holes 20 and plurality of first tube holes 21 and second tube holes 23 help attach the first tube 15 and the second tube 16 to the first cradle assembly 11 and allow the tubes to pivot within the cradle mount 13. Further, as seen in FIG. 7, the plurality of cradle fastener holes 20 and plurality of tube holes also help to maintain the first tube 18 and the second tube 19 in a horizontal plane. Preferably, the horizontal position is used to transport paddle boards and canoes. In the horizontal configuration, a third tube fastener 22b and a fourth tube fastener 24b penetrate through the plurality of cradle fastener holes 20, to secure the first tube 15 and the second tube 16 parallel to the longitudinal axis 17.

Continuing with the preferred embodiment, each of the plurality of cradle assemblies 3 further comprises a first angle fastener 25, and a second angle fastener 26. Preferably, the first angle fastener 25 engages into a corresponding first angle fastener hole 21b from the plurality of first tube holes 21. This is so that the first angle fastener 25 retains the first tube 18 at a specific angle relative to the longitudinal axis 17. Similarly, the second angle fastener 26 engages into a corresponding second angle fastener hole 23b from the plurality of second tube holes 23, so that the second angle fastener 26 retains the second tube 19 at a specific angle relative to the longitudinal axis 17. Preferably, the first tube fastener 22a and the second tube fastener 24a are spring pins and the first angle fastener 25, and the second angle fastener 26 are clevis pins. However, it should be noted that, any other types of fasteners, fastening techniques or methods that are known to one of ordinary skill in the art, may be used to attach and incline the tubes to the cradle mounts, as long as the intents of the present invention is not altered.

Figure 3:
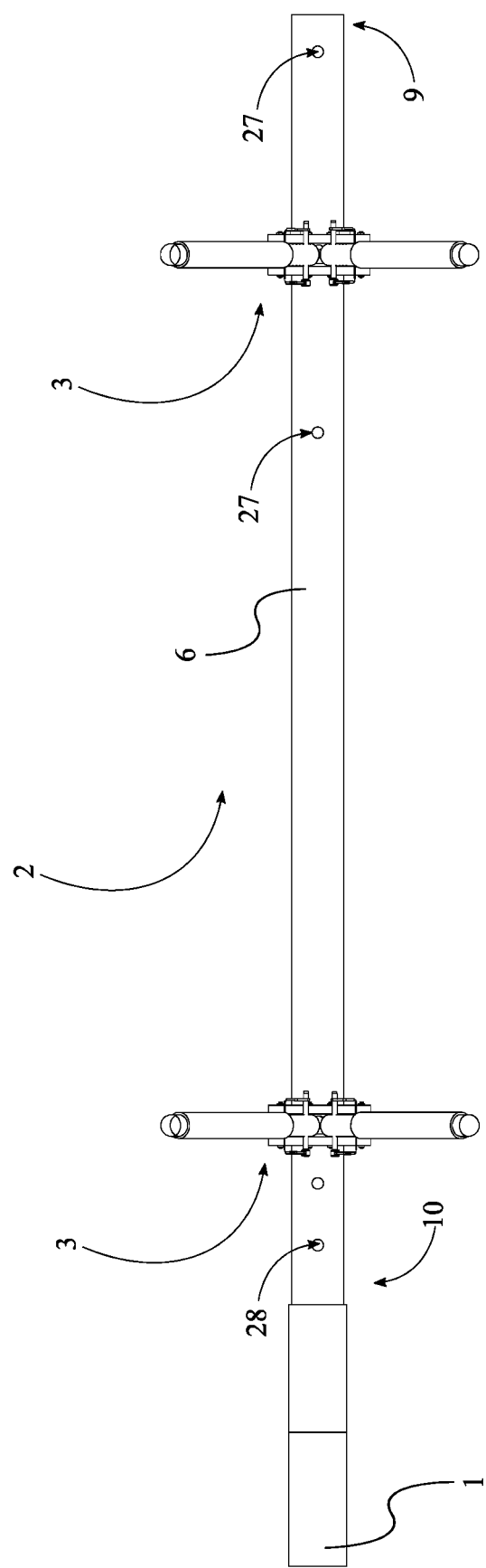
FIG. 3 is a top plan view of the present invention.

Continuing with the preferred embodiment, the support frame 2 comprises a plurality of front cradle mounting holes 27, and a plurality of rear cradle mounting holes 28. As seen in FIG. 3, the plurality of front cradle mounting holes 27 is positioned adjacent the front end 9 of the support frame 2, and the plurality of front cradle mounting holes 27 traverses through the upper support frame 6. The front cradle mounting holes 27 depict the possible positions for mounting the first cradle assembly 11 on to the support frame 2. Similarly, the plurality of rear cradle mounting holes 28 is positioned adjacent the rear end 10 of the support frame, and the plurality of rear cradle mounting holes 28 traverses through the upper support frame 6. The rear cradle mounting holes 28 depict the possible positions for mounting the second cradle assembly 12 on to the support frame 2. Accordingly, the first cradle assembly 11 is engaged into one of the plurality of front cradle mounting holes 27, and the second cradle assembly 12 is engaged into one of the plurality of rear cradle mounting holes 28. This arrangement of the front cradle mounting holes 27 and the rear cradle mounting holes 28 allow the plurality of cradle assemblies 3 to be adjustable with respect to the length of the user's kayak, thereby providing efficient and flexible loading/unloading and transporting means.

As seen in FIG. 4 through FIG. 7, the present invention further comprises at least one light 29 for extra visibility and safety. Preferably, the light 29 is mounted on the first cradle assembly 11, opposite to the dual hitch receiver 1. Further, the at least one light 29 is attached to the vehicle's electrical system with standard trailer wiring, such that the light 29 turns on, when the light is activated with a switch or when the brakes of the vehicle are applied.

Continuing with the preferred embodiment, the present invention comprises a tie down strap 30 for additional securement of the kayak to the support frame 2. As seen in, FIG. 8 through FIG. 10 a length of the tie down strap 30 is sufficient to encompass a kayak 31 mounted onto the support frame 2. Preferably, the tie down strap 30 is a single loop adjustable tie down strap, that is placed approximately midway between the first cradle mount 11 and second cradle mount 12. The user may sufficiently tighten the tie down strap 30 which acts as an additional frame member, further stabilizing the load. Further, the tie down strap 30 goes around the kayak 31 and around the upper frame 6 only.

Continuing with the preferred embodiment of the present invention, the dual hitch receiver 1 comprises a plurality of receiver fastening holes 32. According to the preferred embodiment, the upper frame 6 and lower frame 7 are mounted to the dual hitch receiver 1 by the insertion of the shafts of the upper frame 6 and the lower frame 7 into the receptacle receiver of the dual hitch receiver 1. The upper frame 6 and the lower 7 frame are then locked onto the dual hitch receiver 1 by means of fasteners or pins that penetrates through the receiver fastening holes 32. Preferably, the dual hitch receiver 1 is an off the shelf component that couples the support frame 2 to the vehicle. However, the preferred embodiment comprises a customized fastening hole 32a that accepts a ⅜ pin. This additional fastening hole 32a and associated fastener element, eliminates bouncing that occurs due to slack in the hitch pins. Further, this additional pin also creates a right-angle triangular support, thereby aiding in the overall coupling strength of the dual hitch receiver 1. Preferably, the towing capacity of the dual hitch receiver 1 is between 4,000 and 5,000 pounds, with the tong weight capacities in excess of 400 pounds. However, any other variety of hitch receivers that are known to one of ordinary skill in the art may be used, as long as the intents of the present invention is not altered.

Additionally, the present invention may comprise a tail cushion underneath to the rear end 10 of the support frame 2. This is because the present invention is an extension of the tow vehicle, and hence the rear spring/shock assemblies work in tandem with the support frame 2. If the tow vehicle encounters a rough area or a speed bump, the spring/shocks of the vehicle will react, and the rear of the frame could dip and possibly come to contact the road surface. Thus, the support frame 2 may comprise a tail cushion, a rubber or PVC pad, which may be attached underneath the rear of the support frame for minimizing any potential damage. Note that the tail cushion is not limited to rubber or PVC, as it can be any material that is used to prevent damage on the rear end of the support frame.

Although the invention has been explained in relation to its preferred embodiment, it is to be understood that many other possible modifications and variations can be made without departing from the spirit and scope of the invention.

What is claimed is:

1. A device for transporting a kayak comprising:
a dual hitch receiver;
a support frame;
a plurality of cradle assemblies;
the dual hitch receiver comprising a single attachment end and a dual attachment end;
the support frame comprising an upper frame, a lower frame, a reinforcement frame, a front end and a rear end;
the single attachment end being positioned opposite to the dual attachment end across the dual hitch receiver;
the front end being positioned opposite to the rear end across the support frame;
the rear end of the support frame being inserted into the dual attachment end of the dual hitch receiver;
the reinforcement frame being connected between the upper frame and the lower frame;
the lower frame being terminally attached to the upper frame;
the lower frame being angularly offset from the upper frame;
a first cradle assembly from the plurality of cradle assemblies being mounted onto the upper frame, adjacent the front end;
a second cradle assembly from the plurality of cradle assemblies being mounted onto the upper frame, adjacent the rear end;
each of the plurality of cradle assemblies comprising a cradle mount, a channel, a first tube, a second tube;
the cradle mount being mounted adjacent the upper frame, opposite to the reinforcement frame;
the channel normally traversing through a bottom surface of the cradle mount;
the upper frame being engaged within the channel; and
the first tube and the second tube being axially mounted within the cradle mount, wherein the axial mounting permits angular displacement of the first tube and the second tube with respect to a longitudinal axis of the cradle mount.

2. The kayak transporting device of claim 1, comprising:
a first roller and a second roller;
the first roller being wrapped around the first tube; and
the second roller being wrapped around the second tube.

3. The kayak transporting device of claim 1, comprising:
each of the cradle assemblies further comprising a plurality of cradle fastener holes, a plurality of first tube holes, a first tube fastener, a plurality of second tube holes, a second tube fastener;
the plurality of cradle fastener holes normally traversing through the cradle mount;
the plurality of first tube holes normally traversing through the first tube;
the first tube fastener being connected between a corresponding first tube cradle fastener hole and a corresponding first tube hole, wherein the corresponding first tube cradle fastener hole is from the plurality of cradle fastener holes, and wherein the corresponding first tube hole is from the plurality of first tube holes;
the plurality of second tube holes normally traversing through the second tube; and
the second tube fastener being connected between a corresponding second tube cradle fastener hole and a corresponding second tube hole, wherein the corresponding second tube cradle fastener hole is from the plurality of cradle fastener holes, and wherein the corresponding second tube hole is from the plurality of second tube holes.

4. The kayak transporting device of claim 3, comprising:
each cradle assembly further comprising a first angle fastener, and a second angle fastener;
the first angle fastener engaging into a corresponding first angle fastener hole from the plurality of first tube holes, wherein the first angle fastener retains the first tube at a specific angle relative to the longitudinal axis; and
the second angle fastener engaging into a corresponding second angle fastener hole from the plurality of second tube holes, wherein the second angle fastener retains the second tube at a specific angle relative to the longitudinal axis.

5. The kayak transporting device of claim 1, wherein the reinforcement frame is positioned adjacent the rear end of the support frame.

6. The kayak transporting device of claim 1, wherein the upper frame and lower frame comprise hollow aluminum (Al) frames with a square cross section.

7. The kayak transporting device of claim 6, wherein the rear end of the support frame that enters the dual attachment end of the dual hitch receiver comprises additional layers of Al affixed around the support frame.

8. The kayak transporting device of claim 1, comprising:
the support frame comprising a plurality of front cradle mounting holes, and a plurality of rear cradle mounting holes;
the plurality of front cradle mounting holes being positioned adjacent the front end of the support frame;
the plurality of front cradle mounting holes traversing through the upper support frame;
the plurality of rear cradle mounting holes being positioned adjacent the rear end of the support frame;
the plurality of rear cradle mounting holes traversing through the upper support frame;
the first cradle assembly being engaged into the plurality of front cradle mounting holes; and
the second cradle assembly engaging into the plurality of rear cradle mounting holes.

9. The kayak transporting device of claim 1, comprising:
a light; and
the light being mounted on the first cradle assembly, opposite to the dual hitch receiver.

10. The kayak transporting device of claim 1, comprising:
a tie down strap; and
a length of the tie down strap being sufficient to encompass a kayak mounted onto the support frame.

11. The kayak transporting device of claim 1, wherein the dual hitch receiver comprises a plurality of fastening holes.

12. A device for transporting a kayak comprising:
a dual hitch receiver;
a support frame;
a plurality of cradle assemblies;
the dual hitch receiver comprising a single attachment end and a dual attachment end;
the dual hitch receiver comprising at least one fastening hole that accepts a ⅜ pin;

the support frame comprising an upper frame, a lower frame, a reinforcement frame, a front end and a rear end;

the single attachment end being positioned opposite to the dual attachment end across the dual hitch receiver;

the front end being positioned opposite to the rear end across the support frame;

the rear end of the support frame being inserted into the dual attachment end of the dual hitch receiver;

the reinforcement frame being connected between the upper frame and the lower frame, wherein the reinforcement frame is positioned adjacent the rear end of the support frame, the lower frame being terminally attached to the upper frame;

the lower frame being angularly offset from the upper frame;

a first cradle assembly from the plurality of cradle assemblies being mounted onto the upper frame, adjacent the front end;

a second cradle assembly from the plurality of cradle assemblies being mounted onto the upper frame, adjacent the rear end;

each of the plurality of cradle assemblies comprising a cradle mount, a channel, a first tube, a second tube, a first roller, and a second roller;

the cradle mount being mounted adjacent the upper frame, opposite to the reinforcement frame;

the channel normally traversing through a bottom surface of the cradle mount;

the upper frame being engaged within the channel;

the first tube and the second tube being axially mounted within the cradle mount, wherein the axial mounting permits angular displacement of the first tube and the second tube with respect to a longitudinal axis of the cradle mount;

the first roller being wrapped around the first tube; and the second roller being wrapped around the second tube.

13. The kayak transporting device of claim 12, comprising:

each of the cradle assemblies further comprising a plurality of cradle fastener holes, a plurality of first tube holes, a first tube fastener, a plurality of second tube holes, a second tube fastener;

the plurality of cradle fastener holes normally traversing through the cradle mount;

the plurality of first tube holes normally traversing through the first tube;

the first tube fastener being connected between a corresponding first tube cradle fastener hole and a corresponding first tube hole, wherein the corresponding first tube cradle fastener hole is from the plurality of cradle fastener holes, and wherein the corresponding first tube hole is from the plurality of first tube holes;

the plurality of second tube holes normally traversing through the second tube;

the second tube fastener being connected between a corresponding second tube cradle fastener hole and a corresponding second tube hole, wherein the corresponding second tube cradle fastener hole is from the plurality of cradle fastener holes, and wherein the corresponding second tube hole is from the plurality of second tube holes;

the cradle assembly further comprising a first angle fastener, and a second angle fastener;

the first angle fastener engaging into a corresponding first angle fastener hole from the plurality of first tube holes, wherein the first angle fastener retains the first tube at a specific angle relative to the longitudinal axis; and the second angle fastener engaging into a corresponding second angle fastener hole from the plurality of second tube holes, wherein the second angle fastener retains the second tube at a specific angle relative to the longitudinal axis.

14. The kayak transporting device of claim 12, comprising:

a light;

the light being mounted on the first cradle assembly, opposite to the dual hitch receiver.

15. The kayak transporting device of claim 12, comprising:

a tie down strap; and a length of the tie down strap being sufficient to encompass a kayak mounted onto the support frame.

* * * * *